United States Patent
Chin et al.

(10) Patent No.: US 8,219,099 B2
(45) Date of Patent: Jul. 10, 2012

(54) METHODS AND APPARATUS FOR SUBSCRIBER STATION-BASED ADMISSION SELECTION IN A WIRELESS COMMUNICATION SYSTEM

(75) Inventors: Tom Chin, San Diego, CA (US); Guangming Carl Shi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 558 days.

(21) Appl. No.: 12/393,036

(22) Filed: Feb. 26, 2009

(65) Prior Publication Data
US 2010/0216466 A1  Aug. 26, 2010

(51) Int. Cl.
*H04W 4/00* (2009.01)
(52) U.S. Cl. .......... 455/437; 455/435.2; 455/435.3; 455/436; 455/453; 370/331; 370/332
(58) Field of Classification Search .......... 455/432.1, 455/434, 435.1–435.3, 436–444, 453; 370/331, 370/332
See application file for complete search history.

(56) References Cited

U.S. PATENT DOCUMENTS

| | | | |
|---|---|---|---|
| 6,363,252 B1 | 3/2002 | Hamalainen et al. | |
| 2002/0049039 A1* | 4/2002 | Natarajan | 455/62 |
| 2005/0169229 A1 | 8/2005 | Cho et al. | |
| 2005/0192011 A1 | 9/2005 | Hong et al. | |
| 2005/0201269 A1 | 9/2005 | Shim et al. | |
| 2007/0155398 A1* | 7/2007 | Park et al. | 455/453 |
| 2007/0258407 A1 | 11/2007 | Li et al. | |
| 2009/0137251 A1* | 5/2009 | Ji et al. | 455/437 |

FOREIGN PATENT DOCUMENTS

| | | |
|---|---|---|
| EP | 2073579 A1 | 6/2009 |
| WO | WO2009131337 | 10/2009 |

OTHER PUBLICATIONS

International Search Report and Written Opinion—PCT/US10/025084, International Search Authority—European Patent Office, May 26, 2010.

* cited by examiner

*Primary Examiner* — Marivelisse Santiago Cordero
*Assistant Examiner* — Dung Hong
(74) *Attorney, Agent, or Firm* — Tyler Overall

(57) ABSTRACT

A subscriber station may identify base stations that have sufficiently strong signal strength so that the base stations are candidates to be used for network entry. The subscriber station may determine which of the candidate base stations is least utilized. The subscriber station may select the least utilized base station for network entry.

17 Claims, 8 Drawing Sheets

METHODS AND APPARATUS FOR SUBSCRIBER STATION-BASED ADMISSION SELECTION IN A WIRELESS COMMUNICATION SYSTEM

TECHNICAL FIELD

The present disclosure relates generally to communication systems. More specifically, the present disclosure relates to methods and apparatus for subscriber station-based admission selection in a wireless communication system.

BACKGROUND

Wireless communication systems have become an important means by which many people worldwide have come to communicate. A wireless communication system may provide communication for a number of subscriber stations, each of which may be serviced by a base station. As used herein, the term "subscriber station" refers to an electronic device that may be used for voice and/or data communication over a wireless communication system. Examples of subscriber stations include cellular phones, personal digital assistants (PDAs), handheld devices, wireless modems, laptop computers, personal computers, etc. A subscriber station may alternatively be referred to as an access terminal, a mobile terminal, a mobile station, a remote station, a user terminal, a terminal, a subscriber unit, a mobile device, a wireless device, user equipment, or some other similar terminology. The term "base station" refers to a wireless communication station that is installed at a fixed location and used to communicate with subscriber stations. A base station may alternatively be referred to as an access point, a Node B, an evolved Node B, or some other similar terminology.

A subscriber station may communicate with one or more base stations via transmissions on the uplink and the downlink. The uplink (or reverse link) refers to the communication link from the subscriber station to the base station, and the downlink (or forward link) refers to the communication link from the base station to the subscriber station.

The resources of a wireless communication system (e.g., bandwidth and transmit power) may be shared among multiple subscriber stations. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

Benefits may be realized by improved methods and apparatus related to the operation of wireless communication systems.

SUMMARY

A method for subscriber station-based admission selection in a wireless communication system is disclosed. The method may be implemented by a subscriber station. In accordance with the method, the subscriber station may identify base stations that have sufficiently strong signal strength so that the base stations are candidates to be used for network entry. The subscriber station may determine which of the candidate base stations is least utilized. The subscriber station may select the least utilized base station for network entry.

A subscriber station that is configured to implement admission selection in a wireless communication system is also disclosed. The subscriber station includes a processor, memory in electronic communication with the processor, and instructions stored in the memory. The instructions may be executable by the processor to identify base stations that have sufficiently strong signal strength so that the base stations are candidates to be used for network entry. The instructions may also be executable to determine which of the candidate base stations is least utilized. The instructions may also be executable to select the least utilized base station for network entry.

An apparatus that is configured to implement admission selection in a wireless communication system is also disclosed. The apparatus may include means for identifying base stations that have sufficiently strong signal strength so that the base stations are candidates to be used for network entry. The apparatus may also include means for determining which of the candidate base stations is least utilized. The apparatus may also include means for selecting the least utilized base station for network entry.

A computer-program product for implementing subscriber station-based admission selection in a wireless communication system is also disclosed. The computer-program product includes a computer-readable medium having instructions thereon. The instructions may include code for identifying base stations that have sufficiently strong signal strength so that the base stations are candidates to be used for network entry. The instructions may also include code for determining which of the candidate base stations is least utilized. The instructions may also include code for selecting the least utilized base station for network entry.

In certain embodiments, as presented herein, including the summary paragraphs above, the subscriber station supports an Institute of Electronic and Electrical Engineers (IEEE) 802.16 standard.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
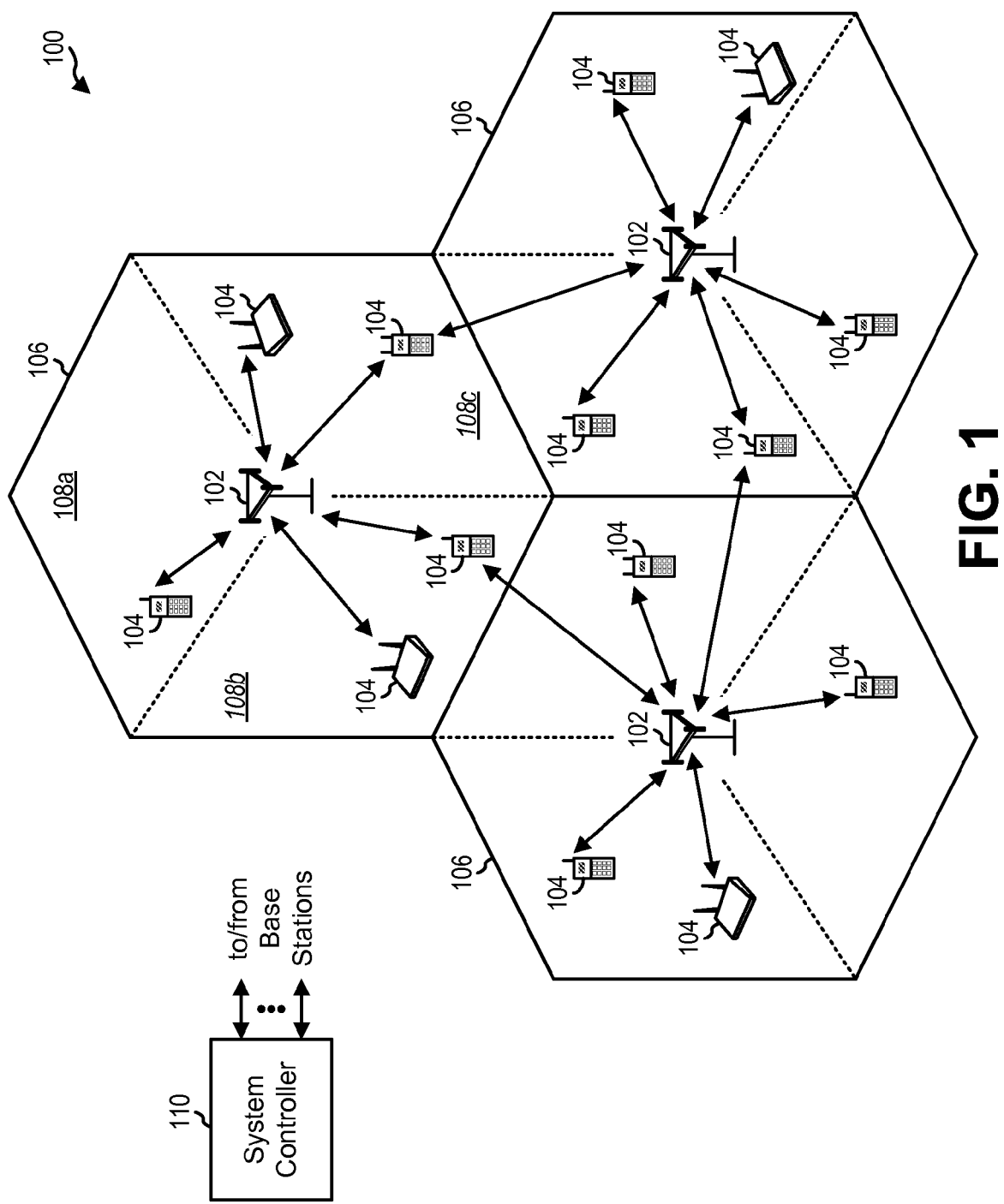
FIG. 1 shows an example of a wireless communication system in which the methods and apparatus disclosed herein may be utilized.

FIG. 1 shows an example of a wireless communication system 100 in which the methods and apparatus disclosed herein may be utilized. The wireless communication system 100 includes multiple base stations (BS) 102 and multiple subscriber stations (SS) 104. Each base station 102 provides communication coverage for a particular geographic area 106. The term "cell" can refer to a base station 102 and/or its coverage area 106 depending on the context in which the term is used.

To improve system capacity, a base station coverage area 106 may be partitioned into multiple smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Subscriber stations 104 are typically dispersed throughout the system 100. A subscriber station 104 may communicate with zero, one, or multiple base stations 104 on the downlink and/or uplink at any given moment.

For a centralized architecture, a system controller 110 may couple to the base stations 102 and provide coordination and control for the base stations 102. The system controller 110 may be a single network entity or a collection of network entities. For a distributed architecture, base stations 102 may communicate with one another as needed.

The terms "system" and "network" may be used interchangeably herein. Thus, the wireless communication system 100 shown in FIG. 1 may also be referred to as a wireless communication network 100.

The IEEE 802.16 Working Group on Broadband Wireless Access Standards aims to prepare formal specifications for the global deployment of broadband Wireless Metropolitan Area Networks. Although the 802.16 family of standards is officially called WirelessMAN, it has been called "WiMAX" (which stands for the "Worldwide Interoperability for Microwave Access") by an industry group called the WiMAX Forum. Thus, the term "WiMAX" refers to a standards-based broadband wireless technology that provides high-throughput broadband connections over long distances. The term "WiMAX system" refers to a wireless communication system that is configured in accordance with one or more WiMAX standards.

The bandwidth and range of WiMAX make it suitable for a number of potential applications, including providing data and telecommunications services, connecting Wi-Fi hotspots with other parts of the Internet, providing a wireless alternative to cable and digital subscriber line for "last mile" broadband access, providing portable connectivity, etc.

The base stations 102 and the subscriber stations 104 in the wireless communication system 100 shown in FIG. 1 may be configured to support a WiMAX standard. Thus, the wireless communication system 100 in FIG. 1 may be referred to herein as a WiMAX system 100 (or WiMAX network 100).

Figure 2:
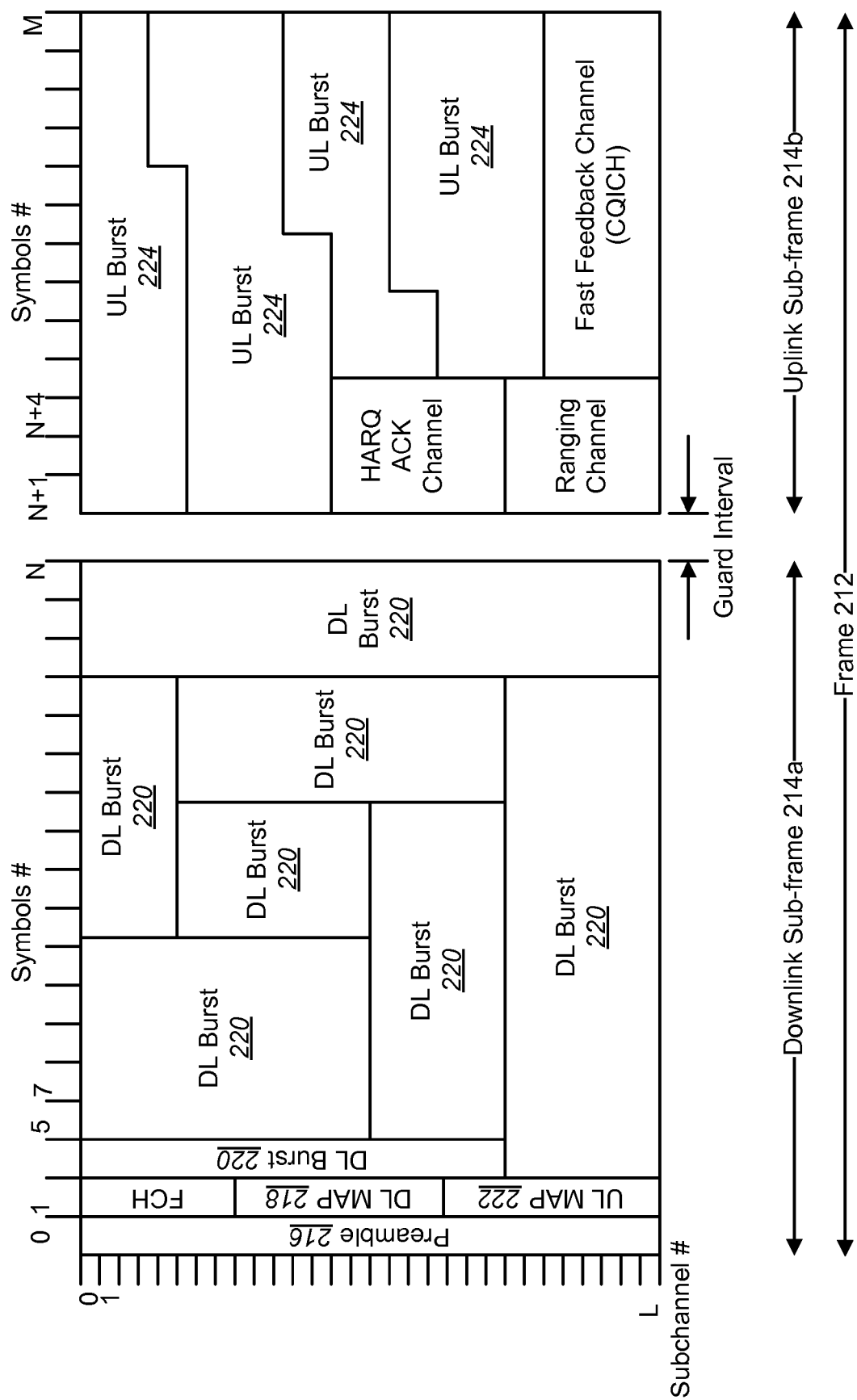
FIG. 2 illustrates a frame structure within a WiMAX system.

FIG. 2 illustrates a frame structure within a WiMAX system. In current WiMAX standards, the medium access control (MAC) layer supports time division duplexing (TDD). In TDD mode, a frame 212 may be divided into two subframes 214: a downlink subframe 214a followed by an uplink subframe 214b. The downlink subframe 214a and the uplink subframe 214b may be transmitted on the same carrier frequency at different times.

The downlink subframe 214b begins with a downlink preamble 216. The preamble 216 is used for physical layer procedures, such as time and frequency synchronization and initial channel estimation.

The downlink subframe 214a includes a downlink MAP (DL MAP) 218 for resource allocation of downlink bursts 220. The information in the DL MAP 218 makes it possible for a subscriber station 104 to identify the downlink bursts 220 that have been allocated to it by the base station 102. For example, the DL MAP 218 includes the downlink burst profile for each subscriber station 104, which defines the modulation and coding scheme that is used.

The downlink subframe 214a also includes an uplink MAP (UL MAP) 222 for resource allocation of uplink bursts 224. The uplink subframe 214b includes the uplink bursts 224. The information in the UL MAP 222 makes it possible for a subscriber station 104 to identify the uplink bursts 224 that have been allocated to it by the base station 102. For example, the UL MAP 222 includes the uplink burst profile for each subscriber station 104, which defines the modulation and coding scheme that is used.

Figure 3:
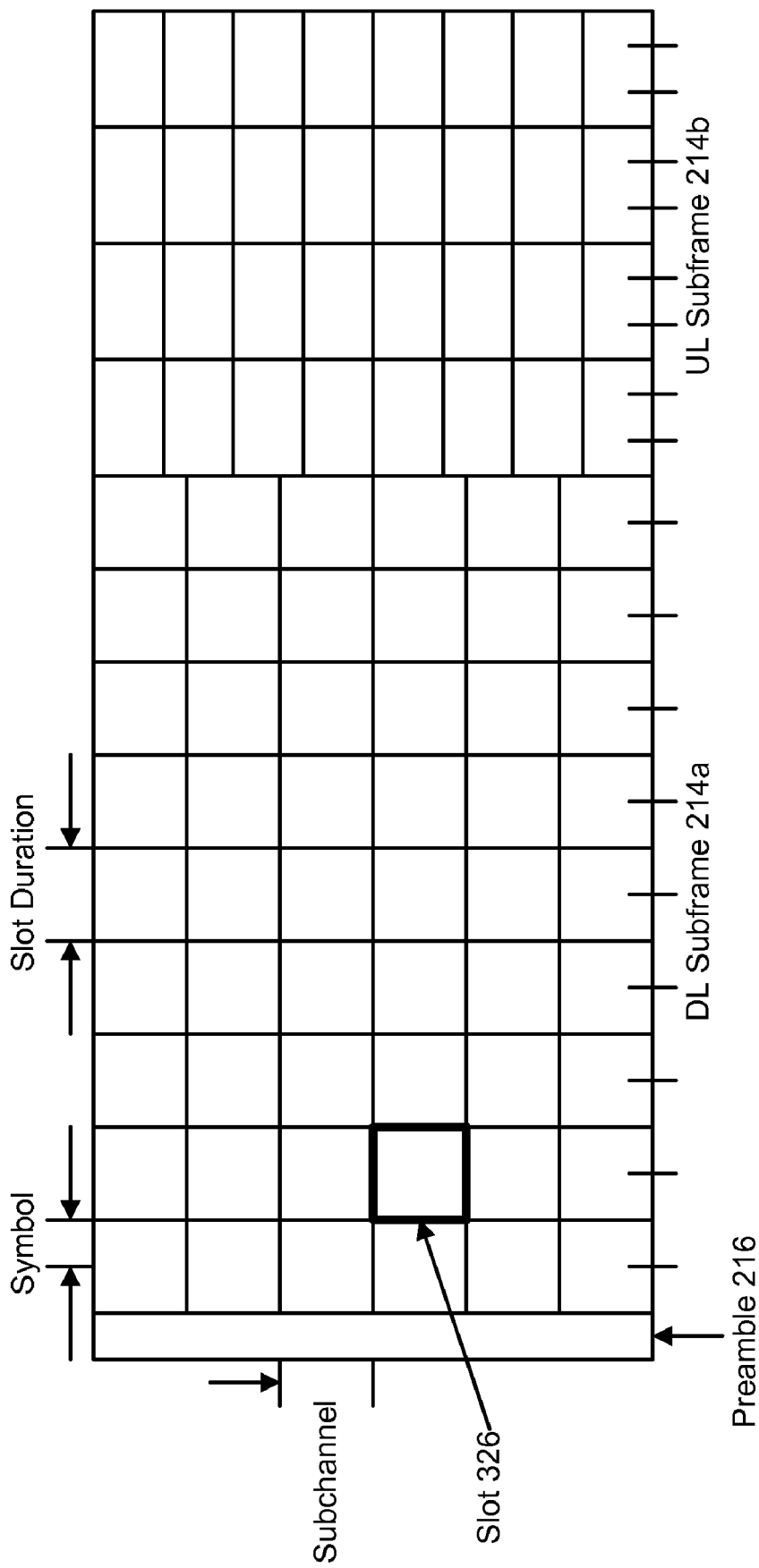
FIG. 3 illustrates a slot within a WiMAX system.

FIG. 3 illustrates a slot 326 within a WiMAX system 100. In current WiMAX standards, the MAC layer allocates time/frequency resources to various subscriber stations 104 in units of slots 326. A slot 326 is the smallest quanta of the physical layer resource that can be allocated to a single subscriber station 104 in the time/frequency domain.

Thus, when a slot 326 is allocated to a subscriber station 104 during the downlink subframe 214a, the base station 102 utilizes certain frequency resources of the system 100 to transmit information to the subscriber station 104 during a specified time period. Similarly, when a slot 326 is allocated to a subscriber station 104 during the uplink subframe 214b, the subscriber station 104 is permitted to utilize certain frequency resources of the system 100 to transmit information to the base station 102 during a specified time period. A burst (such as a downlink burst 220 or an uplink burst 224) is an allocation of one or more continuous slots 326 with the same modulation and coding scheme.

The present disclosure relates generally to subscriber station 104 based admission selection in a wireless communication system 100. More specifically, the present disclosure relates to the situation where a subscriber station 104 is located within the coverage area of multiple base stations 102, and the subscriber station 104 chooses one of the base stations 102 for network entry. In this context, the term "network entry" may refer to initial network entry, i.e., where a subscriber station 104 that is not in electronic communication with any base station 102 establishes a connection with a base station 102. Alternatively, the term "network entry" may refer to network reentry in handover, i.e., where a subscriber station 104 transitions from having a connection with one base station 102 to having a connection with another base station 102.

If a subscriber station 104 is located within the coverage area of multiple base stations 102, but only one of the base stations 102 has sufficient signal strength (which may be determined by comparing the signal strength with a threshold), then the subscriber station 104 may select the only base station 102 that has adequate signal strength for network entry.

However, a subscriber station 104 may be located within the coverage area of multiple base stations 102 that have sufficient signal strength. In this situation, it may be desirable for a subscriber station 104 to choose the preferred base station 102 using one or more metrics other than signal strength. The present disclosure proposes a new metric for a subscriber station 104 to select the preferred base station 102. More specifically, the present disclosure proposes that the subscriber station 104 select the base station 102 that is least utilized, i.e., that has the most available resources to allocate to the subscriber station 104. Stated another way, the subscriber station 104 may utilize a loading metric to select a preferred base station 102. This approach may decrease the likelihood that the subscriber station 104 will be rejected by the network 100. In addition, this approach may allow the subscriber station 104 to obtain the best quality of service (QoS) while entering the WiMAX network 100. Various techniques for determining which of the base stations 102 is the least utilized are discussed below.

Figure 4:
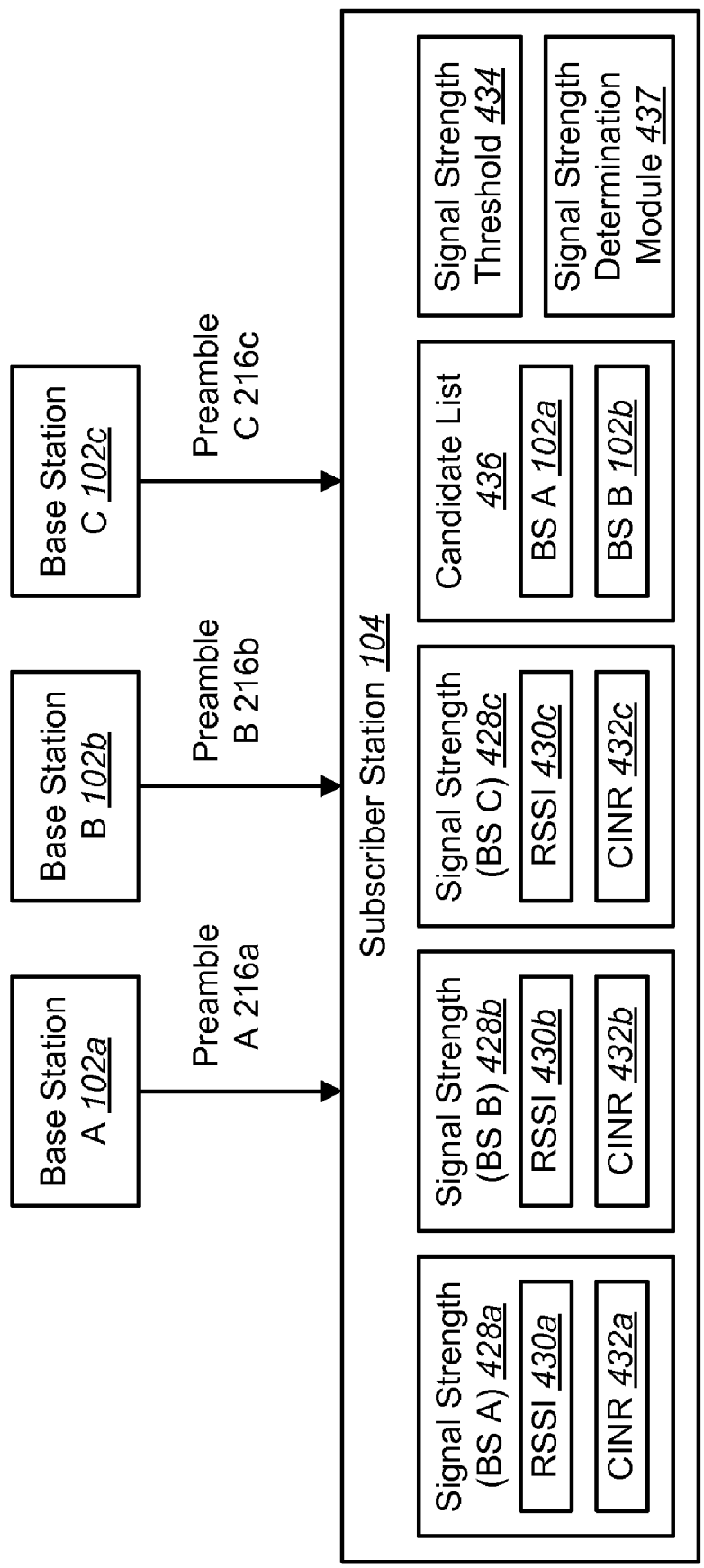
FIG. 4 illustrates an example showing how a subscriber station may identify base stations that are candidates to be used for network entry.

FIG. 4 illustrates an example showing how a subscriber station 104 may identify base stations 102 that are candidates to be used for network entry.

The subscriber station 104 may be in a location where it is capable of receiving signals from multiple base stations 102. The subscriber station 104 may determine the signal strength 428 of these base stations 102. FIG. 4 shows the subscriber station 104 determining the signal strength 428a for base station A 102a, the signal strength 428b for base station B 102b, and the signal strength 428c for base station C 102c.

The signal strength 428 for a particular base station 102 may be determined by making one or more measurements with respect to a known signal that is transmitted by the base station 102. The known signal may be the preamble 216 that is transmitted by the base station 102. The measurements that are taken with respect to the known signal may include the Received Signal Strength Indication (RSSI) 430 and/or the Carrier to Interference-plus-Noise Ratio (CINR) 432. Thus, the subscriber station 104 may determine the RSSI 430a, 430b, 430c and/or the CINR 432a, 432b, 432c with respect to the preambles 216a, 216b, 216c from the base stations 102a, 102b, 102c.

Once the subscriber station 104 has determined the signal strength 428 of a particular base station 102, the subscriber station 104 may then determine whether the signal strength 428 exceeds a threshold 434. This threshold 434 may be referred to herein as the signal strength threshold 434. If the signal strength 428 that is determined for a particular base station 102 exceeds the signal strength threshold 434, then that base station 102 may be considered to be a candidate for network entry.

For example, suppose that the signal strength 428a for base station A 102a and the signal strength 428b for base station B 102b both exceed the signal strength threshold 434, but the signal strength 428c for base station C 102c does not exceed the threshold 434. In this situation, then both base station A 102a and base station B 102b may be considered to be candidates for network entry. However, base station C 102c may not be considered to be a candidate for network entry.

The subscriber station 104 may create a list 436 of candidate base stations 102. The list 436 of candidate base stations 102 may include the base stations 102 that have a signal strength 428 that is greater than the signal strength threshold 434. Continuing with the above example, the list 436 may indicate that base station A 102a and base station B 102b are both candidate base stations 102. However, base station C 102c may not be included in the list 436.

The subscriber station 104 is shown with a signal strength determination module 437. The signal strength determination module 437 may implement the functionality of determining the signal strength 428 of various base stations 102.

Figure 5:
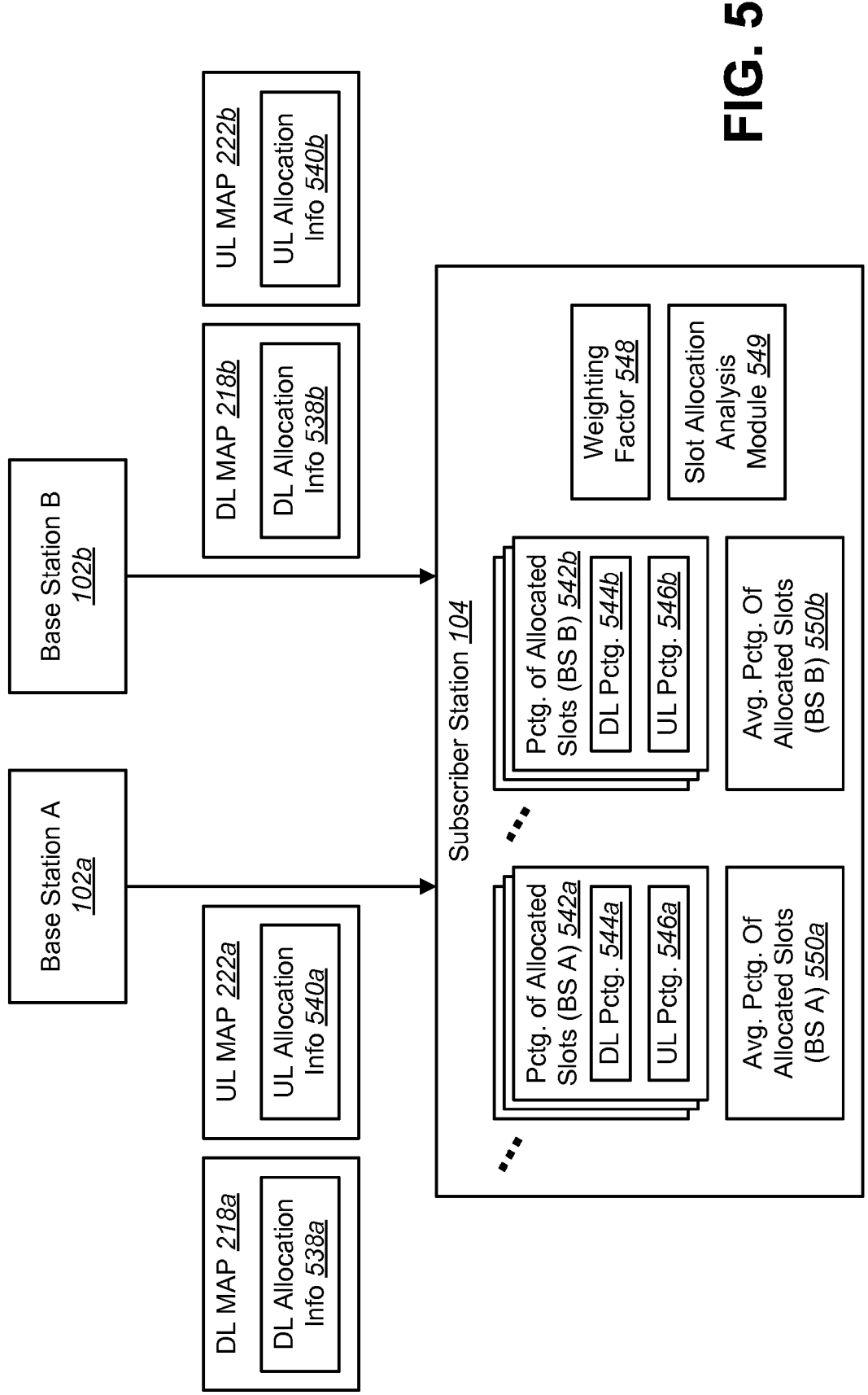
FIG. 5 illustrates an example showing how a subscriber station may determine which of the candidate base stations is least utilized.

FIG. 5 illustrates an example showing how a subscriber station 104 may determine which of the candidate base stations 102 is least utilized.

The subscriber station 104 may acquire allocation information for each of the candidate base stations 102. The allocation information may include both downlink allocation information 538 and uplink allocation information 540. The allocation information may include information about data burst allocation and also control channel allocation.

Continuing with the above example, it will be assumed that there are two candidate base stations 102, base station A 102a and base station B 102b. Thus, FIG. 5 shows the subscriber station 104 acquiring downlink allocation information 538a, 538b and uplink allocation information 540a, 540b for both base station A 102a and base station B 102b, respectively.

A subscriber station 104 in a WiMAX system 100 may acquire allocation information for candidate base stations 102 via MAP messages, such as the DL MAP message 218 and the UL MAP message 222. The MAP messages may be received when the subscriber station 104 is determining the signal strength 428 of base stations 102 (e.g., as part of preamble 216 acquisition and measurement). FIG. 5 shows the subscriber station 104 receiving downlink MAP messages 218a, 218b (which include downlink allocation information 538a, 538b) and uplink MAP messages 222a, 222b (which include uplink allocation information 540a, 540b) from base station A 102a and base station B 102b, respectively.

The subscriber station 104 may calculate, for each of the candidate base stations 102a, 102b, the percentage 542 of allocated slots 326 within a frame 212. In order to calculate the percentage 542 of allocated slots 326 for a particular base station 102, the subscriber station 104 may calculate the percentage 544 of allocated slots 326 within the downlink subframe 214a. Similarly, the subscriber station 104 may calculate the percentage 546 of allocated slots 326 within the uplink subframe 214b. The downlink allocation information 538 from a particular base station 102 may be used to calculate the percentage 544 of allocated slots 326 within the downlink subframe 214a for that base station 102. Similarly, the uplink allocation information 540 from a particular base station 102 may be used to calculate the percentage 546 of allocated slots 326 within the uplink subframe 214b for that base station 102.

To determine the total percentage 542 of allocated slots 326 for a particular base station 102, the subscriber station 104 may calculate a weighted average of the percentage 544 of allocated slots 326 within the downlink subframe 214a for the base station 102 and the percentage 546 of allocated slots 326 within the uplink subframe 214b for the base station 102. For example, the total percentage 542 of allocated slots 326 may be determined as:

$$\text{total\_percentage} = \alpha * \text{DL\_percentage} + (1-\alpha) * \text{UL\_percentage} \qquad (1)$$

In equation (1), the term total_percentage is the total percentage 542 of allocated slots 326 within a frame 212. The term DL_percentage is the percentage 544 of allocated slots 326 within the downlink subframe 214a. The term UL_percentage is the percentage 546 of allocated slots 326 within the uplink subframe 214b. The term $\alpha$ is a weighting factor 548.

Thus, the percentage 542a of allocated slots 326 for base station A 102a may be a weighted average of the percentage 544a of allocated slots 326 for base station A 102a within the downlink subframe 214a and the percentage 546a of allocated slots 326 for base station A 102a within the uplink subframe 214b. Similarly, the percentage 542b of allocated slots 326 for base station B 102b may be a weighted average of the percentage 544b of allocated slots 326 for base station B 102b within the downlink subframe 214a and the percentage 546b of allocated slots 326 for base station B 102b within the uplink subframe 214b.

When the percentage 542 of allocated slots 326 has been calculated for each of the candidate base stations 102, the subscriber station 104 may determine which of the candidate base stations 102 has the lowest percentage 542 of allocated slots 326. The candidate base station 102 that has the lowest percentage 542 of allocated slots 326 may then be considered to be the base station 102 that is least utilized. For example, if the subscriber station 104 determines that the percentage 542*a* of allocated slots 326 for base station A 102*a* is less than the percentage 542*b* of allocated slots 326 for base station B 102*b*, then base station A 102*a* may be considered to be the base station 102 that is least utilized, and base station A 102*a* may be selected for network entry.

Due to variations in the allocation of slots 326 from frame 212 to frame 212, the percentage 542 of allocated slots 326 for a single frame 212 may not accurately indicate which base station 102 is the least utilized of the candidate base stations 102. Therefore, the subscriber station 104 may calculate the percentage 542 of allocated slots 326 for multiple frames 212, and then calculate an average percentage 550 of allocated slots 326 over the multiple frames 212. Thus, instead of just selecting the base station 102 that has the lowest percentage 542 of allocated slots 326 within a single frame 212, the subscriber station 104 may select the base station 102 that has the lowest average percentage 550 of allocated slots 326 over multiple frames 212.

Basing the selection of a base station 102 on the average percentage 550 of allocated slots 326 may provide better results than simply basing the selection on the percentage 542 of allocated slots 326 within a single frame 212. For example, suppose that base station A 102*a* is utilized less than base station B 102*b*. Even so, however, within a given frame 212 the percentage 542*a* of allocated slots 326 for base station A 102*a* may be greater than the percentage 542*b* of allocated slots 326 for base station B 102*b*. If the selection of a base station 102 were based on the percentages 542*a*, 542*b* that are determined from such an anomalous frame 212, then the subscriber station 104 may select base station B 102*b* for network entry, even though base station B 102*b* is utilized more than base station A 102*a* averaged over multiple frames. However, if the selection of a base station 102 is based on averages 550*a*, 550*b* of percentages 542*a*, 542*b* that are calculated over multiple frames 212, this reduces the likelihood that anomalous frame(s) 212 will affect the selection of the base station 102.

The subscriber station 104 is shown with a slot allocation analysis module 549. The slot allocation analysis module 549 may implement the functionality of calculating the percentage 542, 550 of allocated slots 326 for each of the candidate base stations 102.

Figure 6:
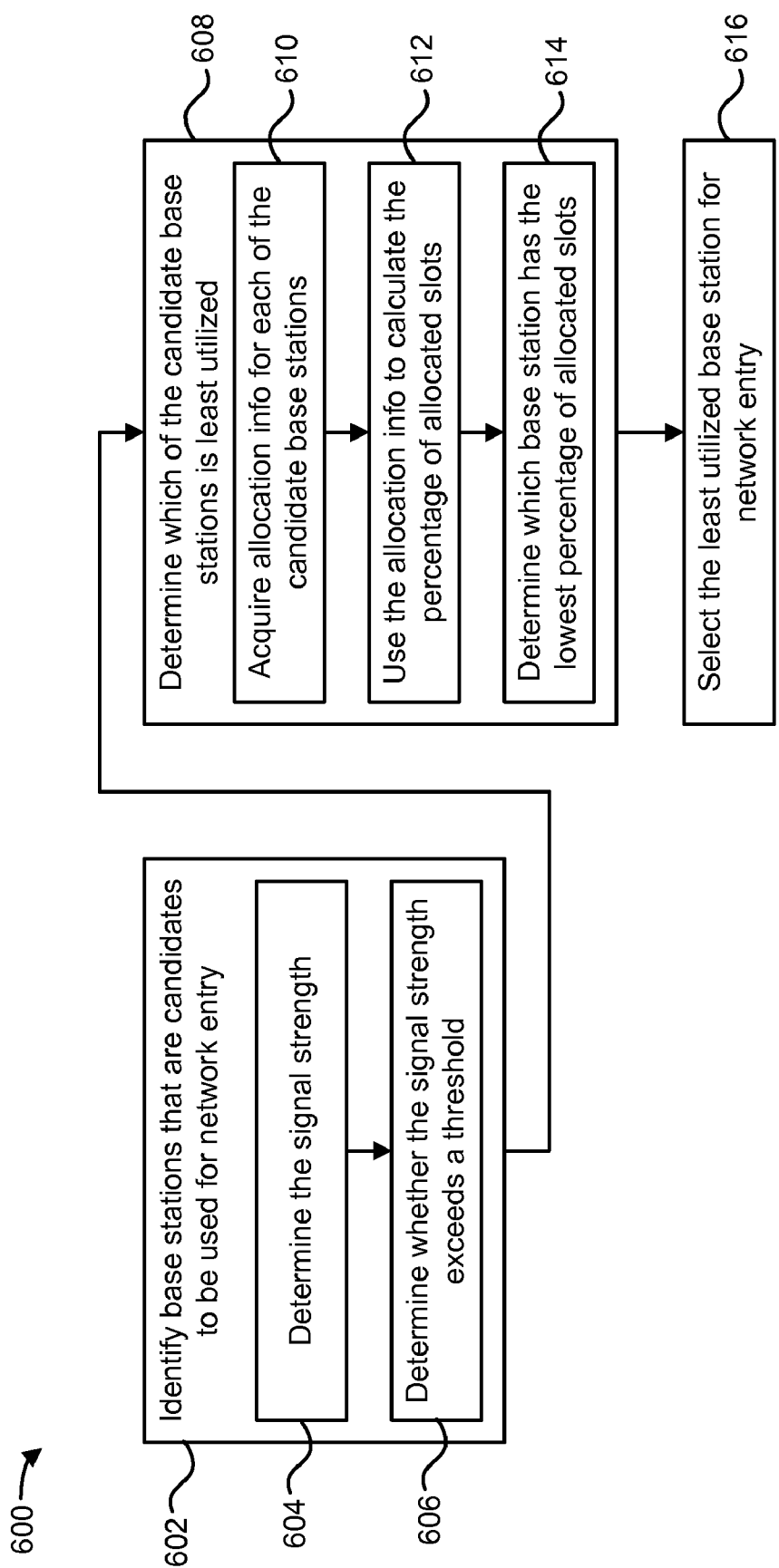
FIG. 6 illustrates a method for subscriber station based admission selection in a wireless communication system.

FIG. 6 illustrates a method 600 for subscriber station 104 based admission selection in a wireless communication system 100. The method 600 may be implemented by a subscriber station 104.

In accordance with the method 600, a subscriber station 104 may identify 602 base stations 102 that have sufficiently strong signal strength 428 so that the base stations 102 are candidates to be used for network entry. Identifying a candidate base station 102 may involve determining 604 the signal strength 428 of a base station 102, and determining 606 whether the signal strength 428 exceeds a threshold 434. If the signal strength 428 exceeds the threshold 434, then the base station 102 may be considered to be a candidate for network entry.

When multiple candidate base stations 102 have been identified 602, the subscriber station 104 may then determine 608 which of the candidate base stations 102 is least utilized. For example, the subscriber station 104 may acquire 610 allocation information (e.g., downlink allocation information 538 and uplink allocation information 540) for each of the candidate base stations 102. The allocation information 538, 540 may be acquired via MAP messages (e.g., DL MAP messages 218 and UL MAP messages 222). The subscriber station 104 may use 612 the allocation information 538, 540 to calculate, for each of the candidate base stations 102, the percentage of allocated slots 326. The percentage of allocated slots 326 may be the percentage 542 of allocated slots 326 within a single frame 212, or the average percentage 550 of allocated slots 326 over multiple frames 212.

When the percentage 542, 550 of allocated slots 326 has been calculated 612 for each of the candidate base stations 102, the subscriber station 104 may determine 614 which of the candidate base stations 102 has the lowest percentage 542, 550 of allocated slots 326. The candidate base station 102 that has the lowest percentage 542, 550 of allocated slots 326 may then be considered to be the base station 102 that is least utilized.

Upon determining 608 which of the candidate base stations 102 is least utilized, the subscriber station 104 may select 616 the least utilized base station 102 for network entry. As indicated above, in this context the term "network entry" may refer to either initial network entry and/or network reentry in handover.

Figure 7:
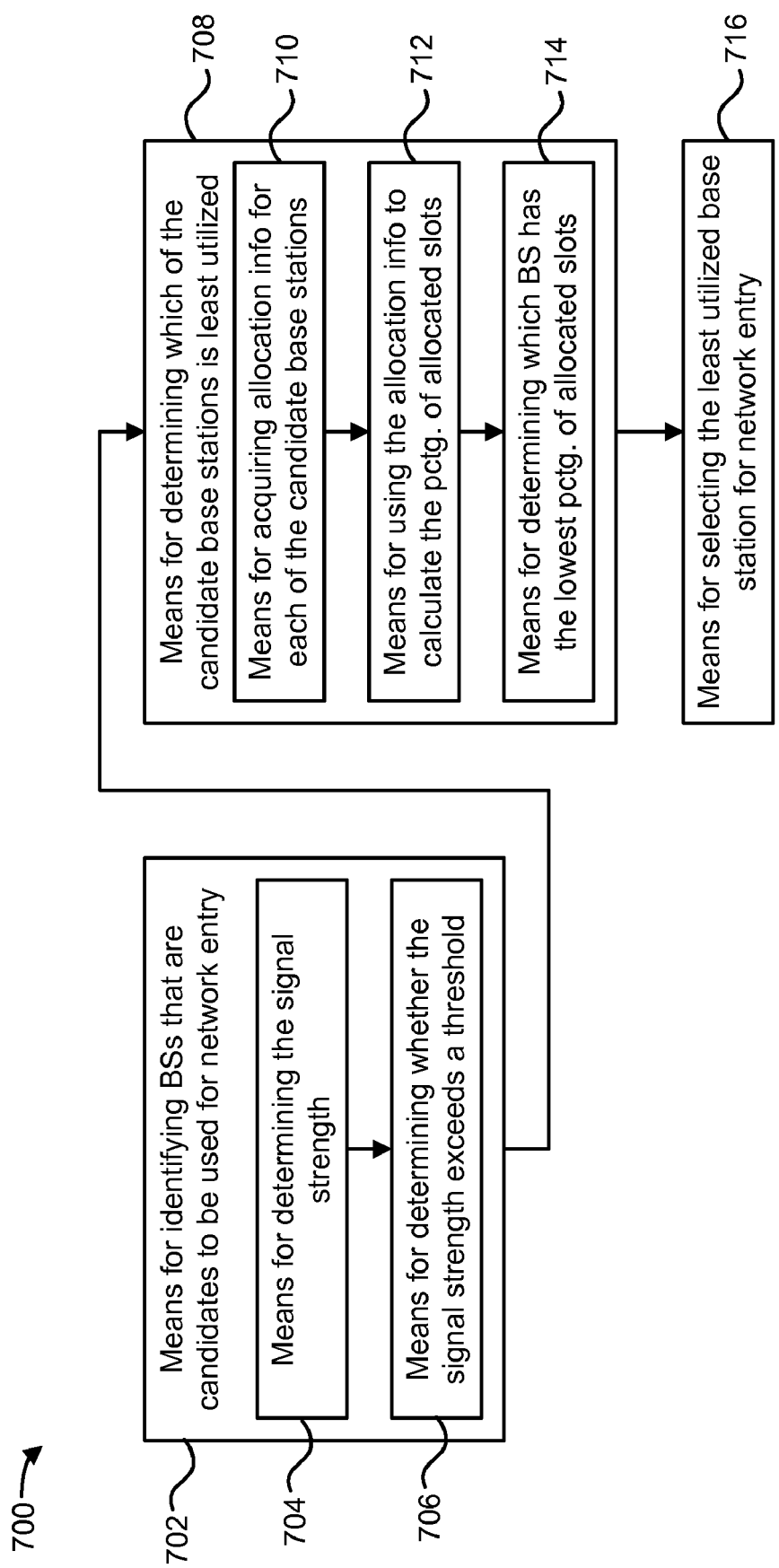
FIG. 7 illustrates means-plus-function blocks corresponding to the method of FIG. 6.

The method 600 of FIG. 6 described above may be performed by various hardware and/or software component(s) and/or module(s) corresponding to the means-plus-function blocks 700 illustrated in FIG. 7. In other words, blocks 602 through 616 illustrated in FIG. 6 correspond to means-plus-function blocks 702 through 716 illustrated in FIG. 7.

Figure 8:
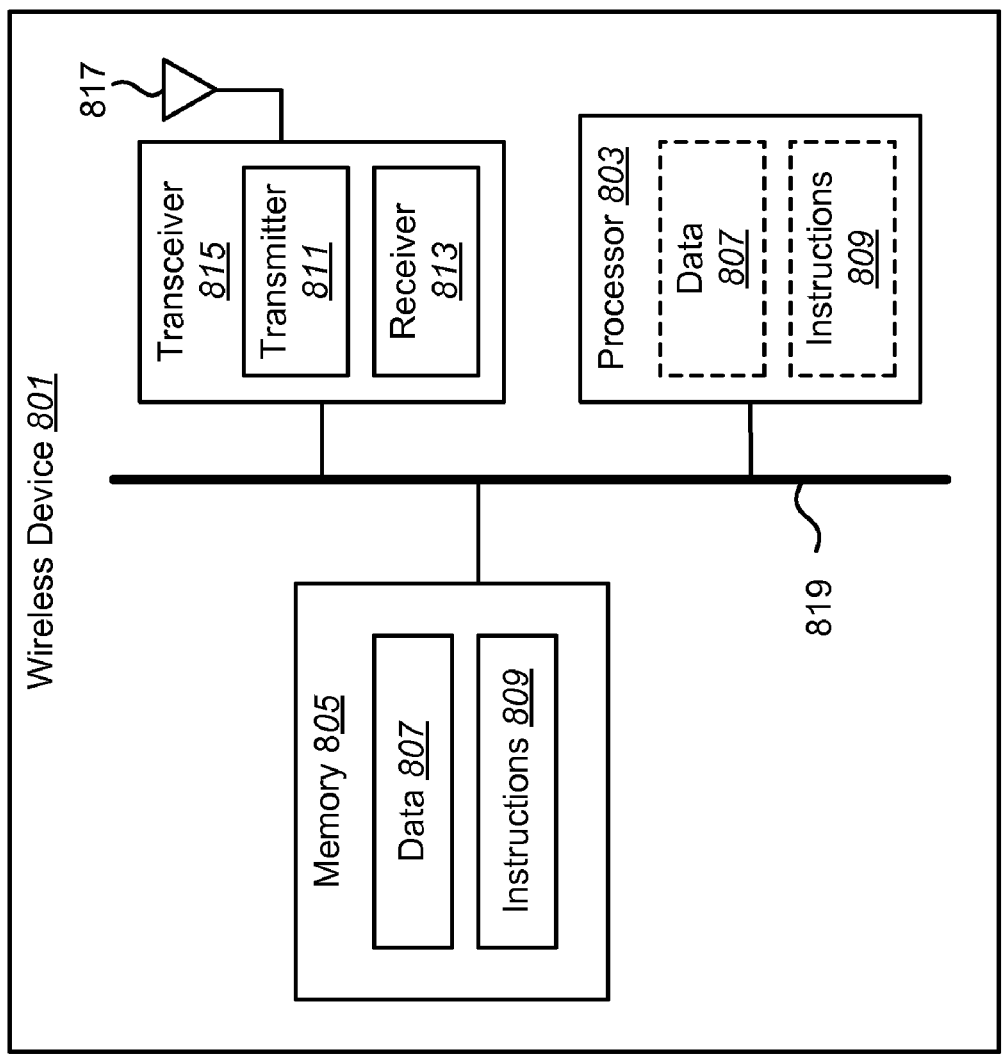
FIG. 8 illustrates certain components that may be included within a wireless device.

FIG. 8 illustrates certain components that may be included within a wireless device 801. The wireless device 801 may be a subscriber station 104 or a base station 102.

The wireless device 801 includes a processor 803. The processor 803 may be a general purpose single- or multi-chip microprocessor (e.g., an ARM), a special purpose microprocessor (e.g., a digital signal processor (DSP)), a microcontroller, a programmable gate array, etc. The processor 803 may be referred to as a central processing unit (CPU). Although just a single processor 803 is shown in the wireless device 801 of FIG. 8, in an alternative configuration, a combination of processors (e.g., an ARM and DSP) could be used.

The wireless device 801 also includes memory 805. The memory 805 may be any electronic component capable of storing electronic information. The memory 805 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 807 and instructions 809 may be stored in the memory 805. The instructions 809 may be executable by the processor 803 to implement the methods disclosed herein. Executing the instructions 809 may involve the use of the data 807 that is stored in the memory 805.

The wireless device 801 may also include a transmitter 811 and a receiver 813 to allow transmission and reception of signals between the wireless device 801 and a remote location. The transmitter 811 and receiver 813 may be collectively referred to as a transceiver 815. An antenna 817 may be electrically coupled to the transceiver 815. The wireless device 801 may also include (not shown) multiple transmitters, multiple receivers, multiple transceivers and/or multiple antennas.

The various components of the wireless device 801 may be coupled together by one or more buses, which may include a power bus, a control signal bus, a status signal bus, a data bus, etc. For the sake of clarity, the various buses are illustrated in FIG. 8 as a bus system 819.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. By way of example, and not limitation, a computer-readable medium may comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 6, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for subscriber station-based admission selection in a wireless communication system, the method being implemented by a subscriber station, the method comprising:
    identifying base stations that have sufficiently strong signal strength so that the base stations are candidates to be used for network entry;
    determining which of the candidate base stations is least utilized based at least in part on, for each of the candidate base stations, a percentage of allocated slots; and
    communicating with a base station with the lowest percentage of allocated slots for network entry,
    wherein the percentage of allocated slots is calculated based at least in part on a weighted average of a percentage of allocated slots within a downlink subframe and a percentage of allocated slots within an uplink subframe.

2. The method of claim 1, wherein identifying a candidate base station comprises:
   determining a base station's signal strength; and
   determining whether the signal strength exceeds a threshold.

3. The method of claim 1, wherein determining which of the candidate base stations is least utilized comprises acquiring allocation information for each of the candidate base stations.

4. The method of claim 3, wherein the allocation information is acquired via MAP messages.

5. The method of claim 1, wherein the percentage of allocated slots is an average percentage taken with respect to multiple frames.

6. A subscriber station that is configured to implement admission selection in a wireless communication system, comprising:
   a processor;
   memory in electronic communication with the processor;
   instructions stored in the memory, the instructions being executable by the processor to:
      identify base stations that have sufficiently strong signal strength so that the base stations are candidates to be used for network entry;
      determine which of the candidate base stations is least utilized based at least in part on, for each of the candidate base stations, a percentage of allocated slots; and
      communicating with a base station with the lowest percentage of allocated slots for network entry,
      wherein the percentage of allocated slots is calculated based at least in part on a weighted average of a percentage of allocated slots within a downlink subframe and a percentage of allocated slots within an uplink subframe.

7. The subscriber station of claim 6, wherein the instructions executable to identify a candidate base station comprise instructions executable to:
   determine a base station's signal strength; and
   determine whether the signal strength exceeds a threshold.

8. The subscriber station of claim 6, wherein the instructions executable to determine which of the candidate base stations is least utilized comprise instructions executable to acquire allocation information for each of the candidate base stations.

9. The subscriber station of claim 8, wherein the allocation information is acquired via MAP messages.

10. The subscriber station of claim 6, wherein the percentage of allocated slots is an average percentage taken with respect to multiple frames.

11. An apparatus that is configured to implement admission selection in a wireless communication system, comprising:
   means for identifying base stations that have sufficiently strong signal strength so that the base stations are candidates to be used for network entry;
   means for determining which of the candidate base stations is least utilized based at least in part on, for each of the candidate base stations, a percentage of allocated slots; and
   means for communicating with a base station with the lowest percentage of allocated slots for network entry,
   wherein the percentage of allocated slots is calculated based at least in part on a weighted average of a percentage of allocated slots within a downlink subframe and a percentage of allocated slots within an uplink subframe.

12. The apparatus of claim 11, wherein the means for identifying a candidate base station comprises:
   means for determining a base station's signal strength; and
   means for determining whether the signal strength exceeds a threshold.

13. The apparatus of claim 11, wherein the means for determining which of the candidate base stations is least utilized comprises means for acquiring allocation information for each of the candidate base stations.

14. The apparatus of claim 13, wherein the allocation information is acquired via MAP messages.

15. The apparatus of claim 11, wherein the percentage of allocated slots is an average percentage taken with respect to multiple frames.

16. A computer-program product for implementing subscriber station-based admission selection in a wireless communication system, the computer-program product embodied in a non-transitory computer-readable medium having instructions thereon, the instructions comprising:
   code for identifying base stations that have sufficiently strong signal strength so that the base stations are candidates to be used for network entry;
   code for determining which of the candidate base stations is least utilized based at least in part on, for each of the candidate base stations, a percentage of allocated slots; and
   code for communicating with a base station with the lowest percentage of allocated slots for network entry,
   wherein the percentage of allocated slots is calculated based at least in part on a weighted average of a percentage of allocated slots within a downlink subframe and a percentage of allocated slots within an uplink subframe.

17. The computer-program product of claim 16, wherein the percentage of allocated slots is an average percentage taken with respect to multiple frames.

* * * * *